United States Patent
Yeh

(10) Patent No.: US 7,440,476 B1
(45) Date of Patent: Oct. 21, 2008

(54) METHOD AND APPARATUS FOR VIDEO CAPTURE

(75) Inventor: Gerard Yeh, Redwood City, CA (US)

(73) Assignee: Zoran Corporation, Sunnyvale, CA (US)

( * ) Notice: Subject to any disclaimer, the term of this patent is extended or adjusted under 35 U.S.C. 154(b) by 334 days.

(21) Appl. No.: 10/879,334

(22) Filed: Jun. 28, 2004

Related U.S. Application Data

(60) Provisional application No. 60/483,033, filed on Jun. 27, 2003.

(51) Int. Cl.
*H04J 3/04* (2006.01)

(52) U.S. Cl. .................. 370/535; 370/498; 370/509; 370/537

(58) Field of Classification Search .............. 370/436, 370/437, 489, 498, 509, 535, 537, 538
See application file for complete search history.

(56) References Cited

U.S. PATENT DOCUMENTS

| | | | | |
|---|---|---|---|---|
| 4,649,536 A | * | 3/1987 | Krinock | 370/470 |
| 6,088,360 A | * | 7/2000 | Amaral et al. | 370/412 |
| 6,269,136 B1 | * | 7/2001 | Hansen et al. | 375/354 |
| 6,721,957 B1 | * | 4/2004 | Lawrence | 725/114 |
| 2002/0080809 A1 | * | 6/2002 | Nicholson et al. | 370/412 |
| 2002/0122515 A1 | * | 9/2002 | Bodenschatz | 375/354 |
| 2003/0159143 A1 | * | 8/2003 | Chan | 725/41 |
| 2003/0169929 A1 | * | 9/2003 | Kohiyama et al. | 382/233 |
| 2004/0120353 A1 | * | 6/2004 | Kim et al. | 370/503 |
| 2004/0233938 A1 | * | 11/2004 | Yamauchi | 370/537 |
| 2005/0185934 A1 | * | 8/2005 | Hatanaka et al. | 386/98 |
| 2005/0259746 A1 | * | 11/2005 | Shinde et al. | 375/240.25 |

* cited by examiner

*Primary Examiner*—Firmin Backer
*Assistant Examiner*—Nguyen Ngo
(74) *Attorney, Agent, or Firm*—Darby & Darby PC; John W. Branch

(57) ABSTRACT

A method and apparatus for providing a technique to transfer two digital video signals synchronously across a bus sharing the same pixel clock and data bus.

21 Claims, 6 Drawing Sheets

METHOD AND APPARATUS FOR VIDEO CAPTURE

REFERENCE TO RELATED APPLICATIONS

The present invention is related to, and claims the benefit of U.S. Provisional Patent Application No. 60/483,033, filed on Jun. 27, 2003, and incorporated herein in its entirety by reference.

FIELD OF THE INVENTION

The present invention relates to video capture, and more particularly, to multi-stream capture.

BACKGROUND

Digital video signals are prevalent in digital television, set-top, portable consumer video equipment such as camcorder, video production, and video distribution systems. These digital video signals generally consist of video clock, video data, and corresponding video synchronization information. Sometimes, ancillary data also is included during video blanking time. The transfer of such data from one electronic device to another usually involves a synchronous transfer on a parallel or serial bus using the video clock. Often, more than one signal is transmitted at the same time.

In traditional video systems, parallel video signals are transmitted in the system using a format such as the digital data stream shown in FIG. 1A. The digital data stream 101 can contain video data, synchronization data (e.g. EAV/SAV,) and ancillary data. A data clock 103 is used. One clock edge, usually the rising edge, is synchronized with the data. If the data rate of video signal is the same as the video pixel rate, than the data clock usually is referred to as the pixel clock. This scheme has been used by the Society of Motion Picture Engineers in standards SMPTE-274M, SMPTE-295M, SMPTE-125M, etc. These standards cover various common video resolutions and synchronization schemes in use, but the same transmission technique can be applied to non-standard video signals. In systems with multiple video signal sources, each video signal is transmitted on a separate video bus. The multiple video buses add expense to the system.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for a technique to transfer two digital video signals synchronously across a bus sharing the same pixel clock and data bus. The multiplexing and transmission and corresponding de-multiplexing and reception process is shown in FIG. 1B.

Figure 1A:
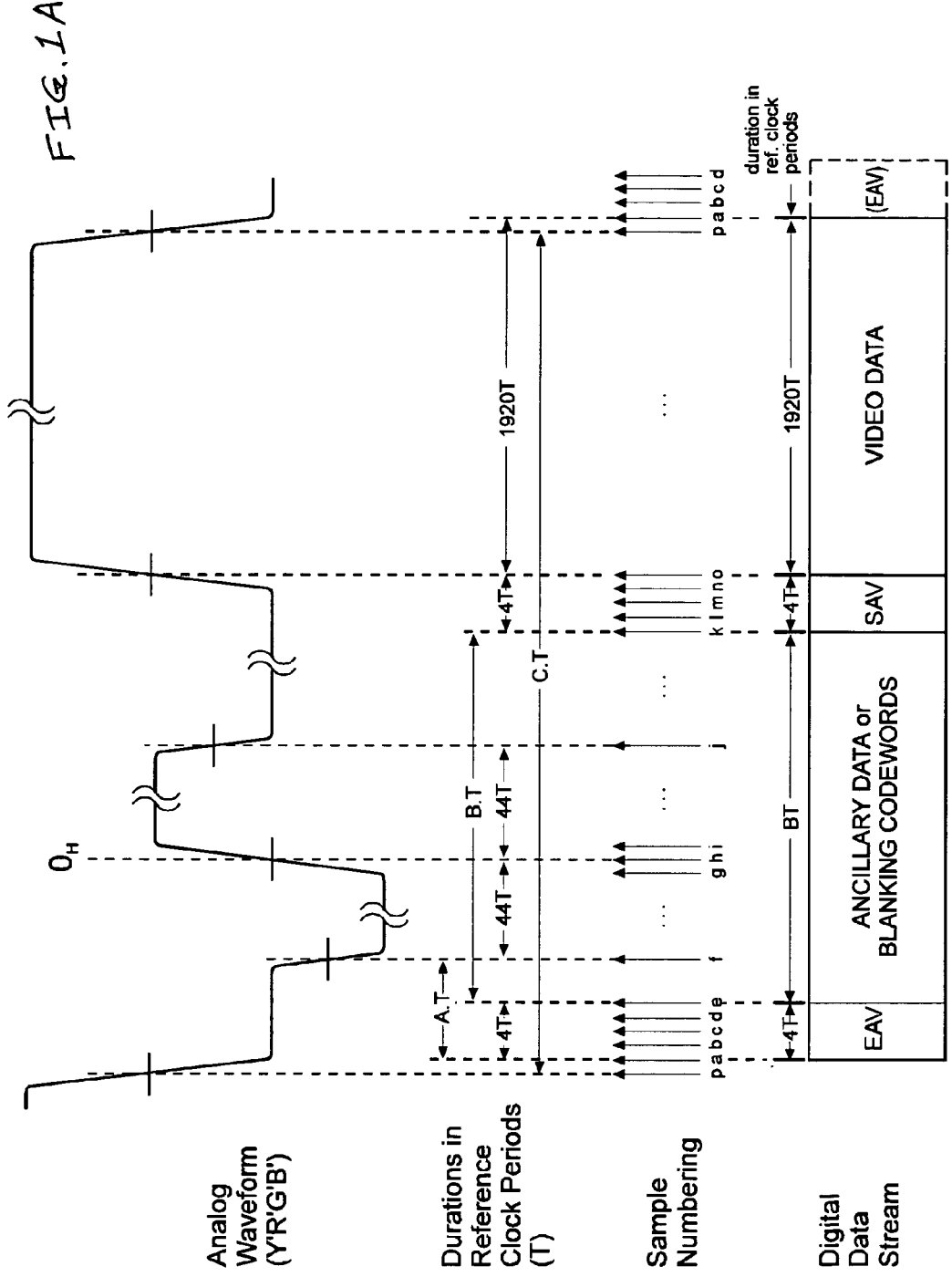
FIG. 1A is an illustration of a digital data stream that may contain video data, synchronization data, and ancillary data.
Figure 1B:
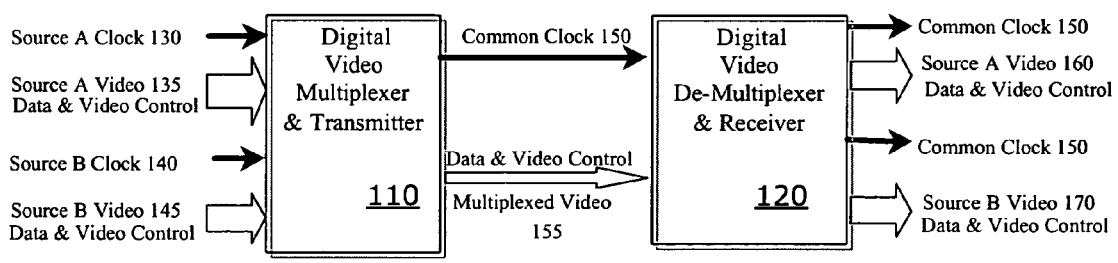
FIG. 1B is a block diagram of one embodiment of a multiplexing video transfer system.

As is shown in FIG. 1B, in one embodiment, the system includes a Digital Video Multiplexer & Transmitter 110, which receives two signals, Stream A 135 and Stream B 145. Each stream 135 or 145 has its own source clock 130 or 140, respectively. Note that in one embodiment both source clocks 130, 140 should have nominally the same frequency. The Digital Video Multiplexer & Transmitter 110 creates a multiplexed video signal 155, based on a common clock 150. The system may further include a Digital Video Demultiplexer & Receiver 120, which takes the multiplexed video signal 155, and recreates Stream A 160 and Stream B 170. Note, however, that Stream A 160 and Stream B 170, output from the Digital Video Demultiplexer & Transmitter 120 are both clocked using common clock 150.

In one embodiment, the video bus multiplexing scheme is implemented in an integrated circuit. In one embodiment, the transmitter and receivers are in a separate semiconductor chips. By utilizing this scheme a smaller form factor package can be chosen for both chips and less board routing is used. The system cost is reduced.

Figure 4:
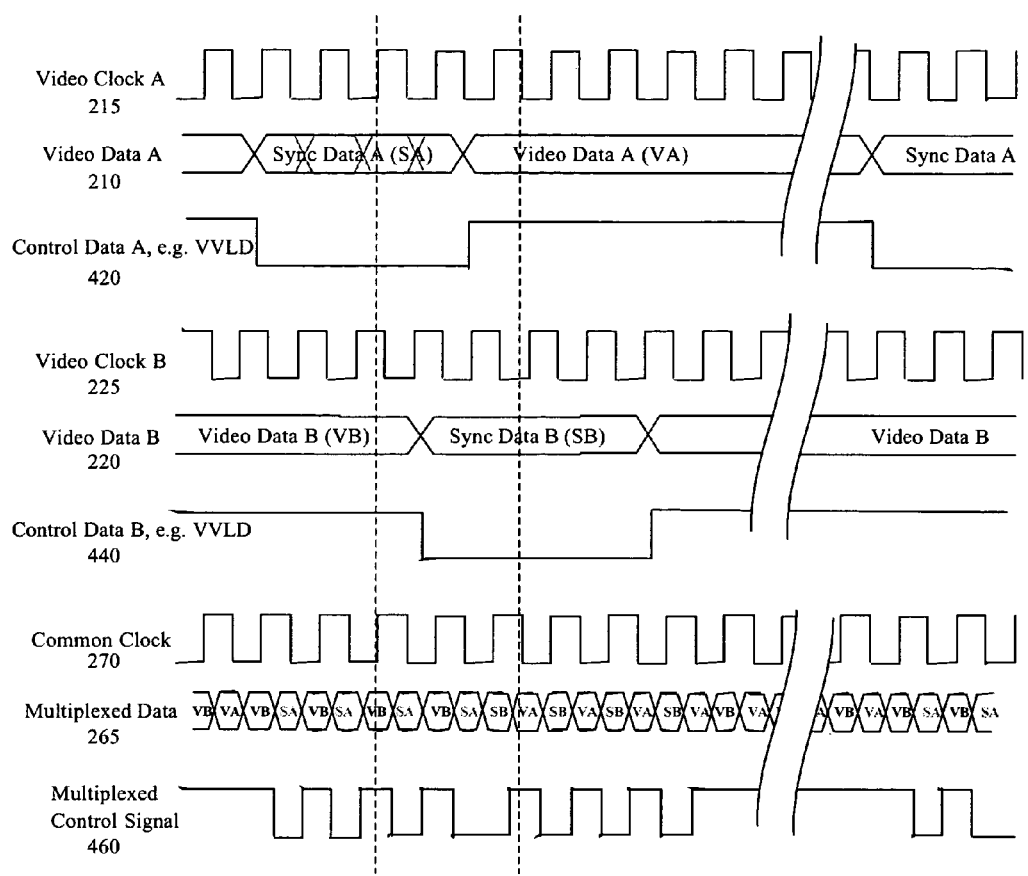
FIG. 4 is a timing diagram, showing one embodiment of the timing for multiplexing two video signals.

One embodiment of a detailed timing diagram of the dual-video multiplexed bus is shown in FIG. 4. As shown in the timing diagram, the video or ancillary data associated with the video source B 220, 440 is multiplexed with the video or ancillary data associated with the video source A 210, 420. The video or ancillary data of source A 210 and control data A 420, after multiplexing, are referenced to the rising edge of the common clock 270. The video or ancillary data of source B 220 and control data B 440, after multiplexing, are referenced to the falling edge of the common clock 270. As can be seen, Source clock A 215 and Source clock B 225 nominally have the same frequency with unknown phase relationship. The FIFO corrects for phase difference of two clocked data streams A and B. The frame drop/repeat algorithm, described in more detail below with respect to FIG. 5, corrects for small frequency offset.

Figure 3:
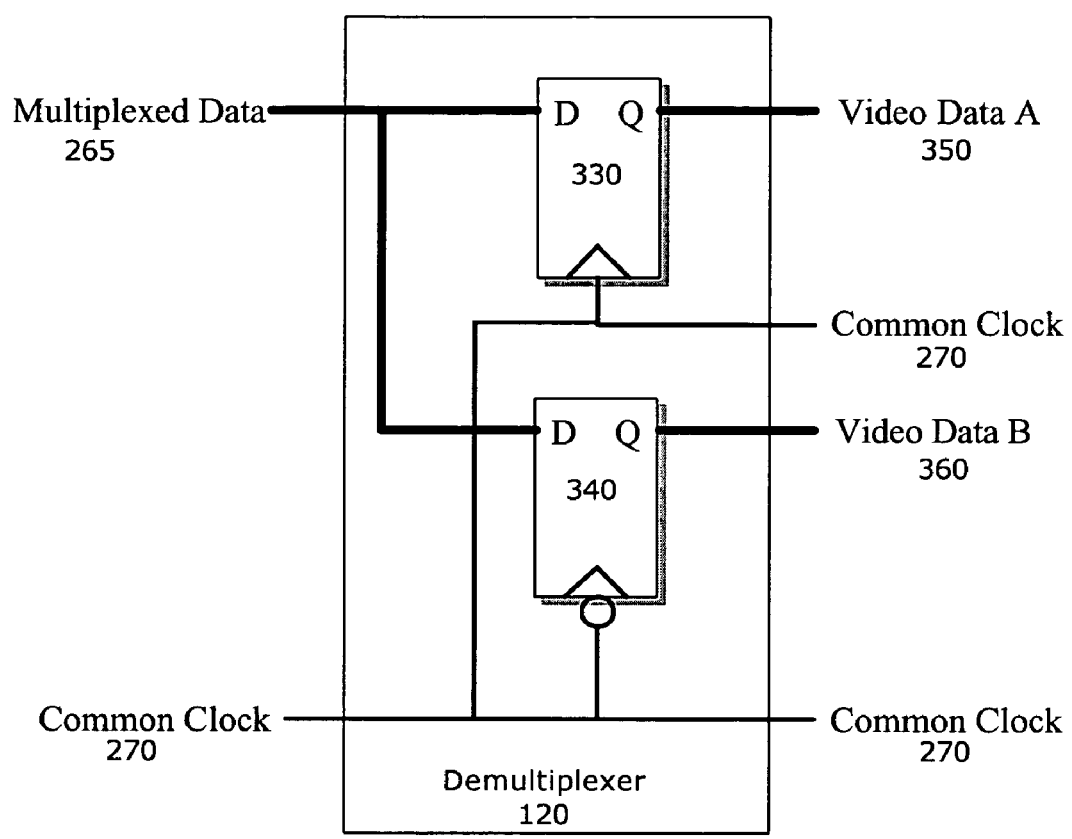
FIG. 3 is an illustration of one embodiment of the demultiplexer.

The receiver of the common clock 270 and multiplexed data 265 can de-multiplex the data by sampling the data bus with different edge of the common clock 270. One embodiment of a circuit to perform the demultiplexing is shown in FIG. 3. In this circuit, the video data B 360, output by demultiplexer 120 continues to reference to the falling edge of the common clock 270. However, this can be changed with a subsequent rising edge flip-flop (not shown) if a subsequent process needs data to be referenced to the rising edge.

Figure 2:
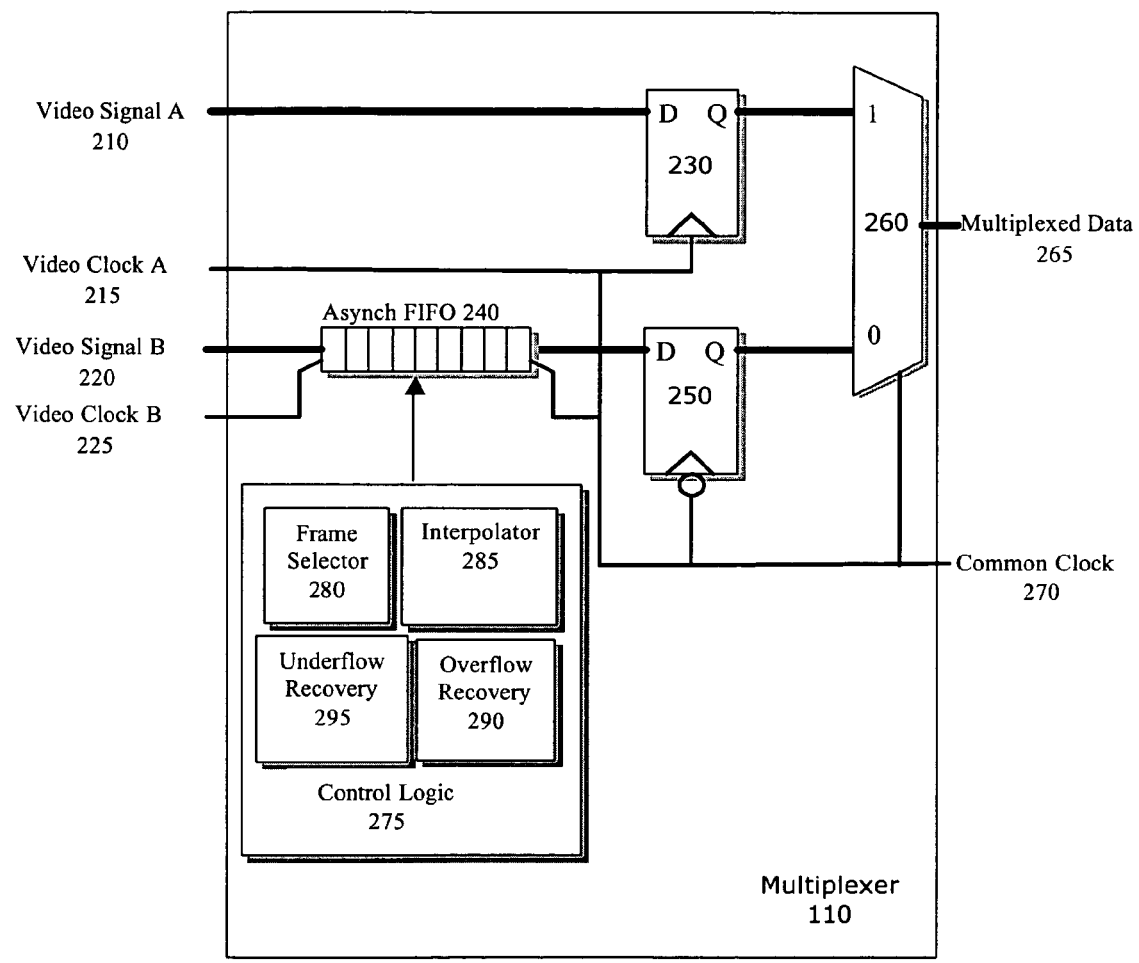
FIG. 2 is an illustration of one embodiment of the multiplexer.

In practical video systems, the video signal A 210 and video signal B 220 are not synchronized. The video clocks of signal A and signal B, 215, 225 do not have a well-defined phase relationship. Further, the two video signals 210, 220 may be generated from different sources, and thus may have a slight difference in frequencies. This mismatch is corrected using a synchronization circuit to align the video sources before sampling and multiplexing by the multiplexer. One embodiment of a block diagram of a multiplexing transmitter is shown in FIG. 2.

The synchronization circuit consists of an asynchronous first-in first-out (FIFO) buffer 240 and associated control logic 275. In one embodiment, the input to the FIFO 240 is clocked by video clock B 225. The output of the FIFO 240 is clocked by video clock C, the common clock 270. This type of FIFO is known as an asynchronous FIFO. The FIFO 240 eliminates data phase uncertainty associated with clock A 215 and clock B 225 phase differences when their frequencies are identical.

A small frequency difference between two clocks 215, 225 cause a phase error to be accumulated over time, causing the FIFO 240 to either overflow or underflow. This difference in video frequencies also means the video frame rate is slightly different. Therefore, addressing the frequency differences can be generalized as an image re-sampling problem. In one embodiment, the video signal B 220 is being re-sampled at the frame rate of the video signal A 210—and video clock A 215 is the common clock 270. To re-sample video, the FIFO 240 must be one frame or more. In one embodiment, the minimum FIFO 240 size should be slightly larger than a video frame to account for the time overhead to correct overflow or underflow.

In one embodiment, re-sampling of the video is conducted using multi-frame memory. Each pixel can be derived from frames before or after the pixel sample, Interpolator 285 performs this type of interpolation. For example, motion estimation processing can be applied. In one embodiment, a simple form of video re-sampling is to duplicate or skip a frame. If the re-sampling used skips frames, frame selector 280 selects which frames to skip. In one embodiment, the frame selector 280 determines what to do.

If there is a frequency difference between video clock A 215 and video clock 225, the FIFO 240 may overflow. In one embodiment, underflow/overflow detector determines if an underflow or an overflow condition is about to occur. If the FIFO 240 overflows, in one embodiment a frame in the FIFO 240 is thrown away by moving the write pointer back to beginning of the video frame. Overflow recovery logic 290 monitors the FIFO 240. If an overflow is detected by overflow recovery logic 290, the overflow recovery logic 290 discards a frame. If the FIFO 240 underflows, in one embodiment underflow recovery logic 295 repeats a frame by moving the read pointer back one frame in the FIFO 240.

Figure 5:
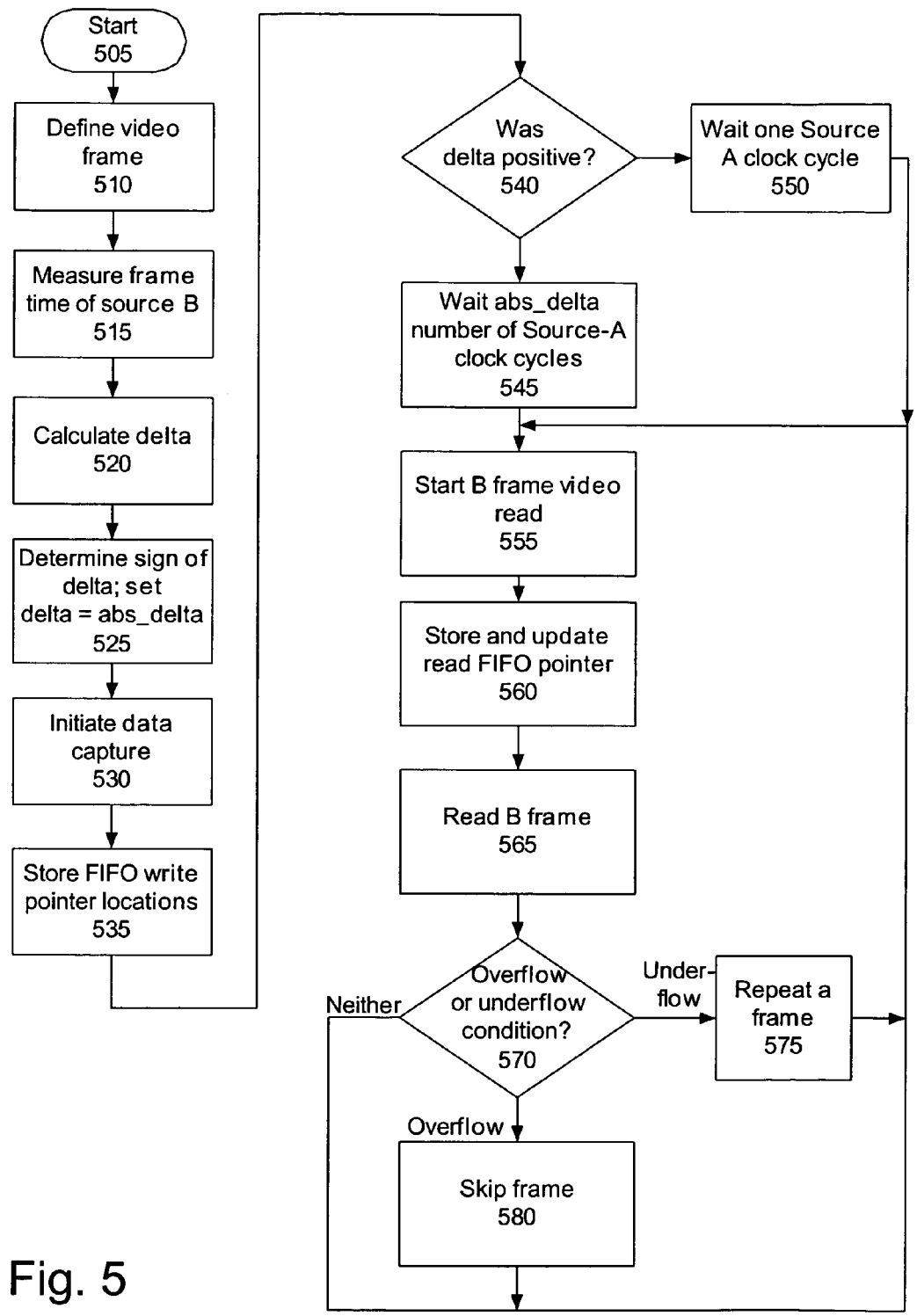
FIG. 5 is a flowchart of one embodiment of the present process, including the frame selection.

FIG. 5 is a flowchart of one embodiment of the present process, including the frame selection. At block 510, the process defines a "video frame" as an entire video frame containing both active video and blank video scan time periods. Two video sources are assumed to have nominally the same clock rate with small frequency offset due to differences in source clocks. The FIFO in this embodiment is assumed to be a circular FIFO. The FIFO pointer arithmetic is based on modulo arithmetic based on the circular FIFO size. In one embodiment, the FIFO size is one B video frame size plus at least the absolute value of difference between the frame rates of source A and source B, defined as sigma. For ease of implementation, and to provide flexibility, a FIFO size larger than sigma is recommended.

In another embodiment, if there is less video or blanking data than permitted by the scan time, the size of the FIFO can be reduced. In this embodiment, the FIFO may be reduced by difference between the size of the frame and the size of actual data to be stored and transmitted through the FIFO. In this instance, in one embodiment, instead of moving the read and write pointers on every clock cycle, the pointer only moves when there is validated data. The pointers are only checked when the scanning of a frame is completed.

At block 515, the process measures the frame time of video source B in terms of source A clock. This measurement is the number of clock cycles of the video source A clock it takes to completely scan a video frame of source B. In one embodiment, this can be accomplished by sampling the B vertical frame signal such as Vsync or V-indicator using the A video clock, to establish a cycle of active vertical region and blanking vertical region has been scanned at the input to the FIFO.

At block 520, the difference between the frame times, defined as delta, is computed. In one embodiment, delta is computed by subtracting the frame time of source A, in terms of source A clock period, from the frame time of source B, in terms of source A clock period.

At block 525, the sign of delta is determined and an adjusted absolute value (abs_delta) is calculated. The sign of delta is then determined—whether it is a positive value or a negative value—to identify whether an underflow or an overflow condition will be encountered. A positive delta indicates B-frame time is longer than the A-frame time. A negative delta indicates B-frame time is shorter than the A-frame time. In one embodiment, the absolute value of delta, abs_delta is adjusted by adding +1. This adjustment is intended to give margin due to measurement error when measuring the source B frame time using the source A clock.

At block 530, B-frame video and control data capture is initiated into the FIFO using B video clock. At block 535, the write FIFO pointer into the FIFO is stored and updated each clock cycle as each data sample is captured into the FIFO.

At block 540, the process determines whether delta was a positive or a negative value. If delta was positive, at block 545, the process waits an abs_delta number of Source-A clock cycles. If delta was negative, at block 550, the process waits one Source-A-clock cycle.

At block 555, B-frame video read from FIFO is started, using video clock A. At block 560, the read FIFO pointer into the FIFO is stored and updated each clock cycle as each data sample is read from the FIFO.

At block 565, the process completes read of one B video frame from FIFO.

At block 570, the process determines whether delta was positive or negative and determines the difference from the FIFO write pointer to the FIFO read pointer. If delta was positive and difference from the FIFO write pointer to the FIFO read pointer is less than the delta, then at block 575 the process subtracts the FIFO read pointer by one frame size (i.e. repeats a frame.) The process then returns to block 555, to read another B-frame video.

If delta is negative, and difference from the FIFO write pointer to the FIFO read pointer is greater than the delta (as a negative number) then at block 580, the process adds the FIFO read pointer by one frame size (i.e. skips a frame.) The process then returns to block 555, to read another B-frame video. In another embodiment, the process may use frame resampling and interpolation, instead of repeating or deleting a frame.

If neither of these conditions is correct, then the process continues directly to block 555, until all of the data has been consumed.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus comprising:
  a video multiplexer to receive a plurality of data streams, each with its own source clock that has nominally, but not exactly, the same frequency, and to generate a multiplexed video signal clocked by a common clock, the common clock having the same frequency as one of the source clocks;
  a synchronization circuit to align the plurality of data streams prior to multiplexing, wherein the synchronization circuit includes an asynchronous first-in first-out (FIFO) buffer having as an input a first stream of the plurality of data streams, said input being clocked by a source clock of the first stream, the FIFO buffer having an output clocked by the common clock, which is one of the data stream source clocks other than the source clock of the first stream, and wherein the synchronization circuit determines a sign of a difference between frame rates of the first stream and a second stream of the plurality of data streams, wherein each of the frame rates of the first stream and the second stream are determined based on the frequency of the source clock of the second stream; and an underflow/overflow detector to detect an overflow condition or an underflow condition in the FIFO based on the sign of the difference between frame rates.

2. The apparatus of claim 1, wherein each said data stream comprises image data and control data.

3. The apparatus of claim 1, wherein the first stream is transmitted on a multiplexed bus synchronized to a rising edge of the common clock, and the second stream of the plurality of data streams is transmitted on the multiplexed bus synchronized to a falling edge of the common clock.

4. The apparatus of claim 1, wherein the common clock is identical to the source clock of the second stream.

5. The apparatus of claim 1, wherein the FIFO is larger than a video frame of the first stream.

6. The apparatus of claim 5, wherein the storage capacity of the FIFO is at least as large as the size of the video frame of the first stream plus an absolute value of the difference between frame rates of the first stream and the second stream of the plurality of data streams.

7. The apparatus of claim 1, further comprising:
wherein the underflow/overflow detector is to determine whether the difference between frame rates of the first stream and the second stream indicates an overflow condition or an underflow condition in the FIFO.

8. The apparatus of claim 7, further comprising:
a recovery logic to recover from the overflow or underflow condition by frame resampling and interpolation.

9. The apparatus of claim 1, further comprising:
an overflow recovery logic to monitor the FIFO and discard a frame when an overflow condition is detected.

10. The apparatus of claim 1, further comprising:
an underflow recovery logic to monitor the FIFO and repeat a frame when an underflow condition is detected.

11. The apparatus of claim 1, further comprising:
a video demultiplexer to receive the multiplexed video signal and create two streams, each stream clocked with the common clock.

12. The apparatus of claim 11, further comprising:
a rising edge flip-flop to move a stream from being clocked on a falling edge of the common clock to being clocked on a rising edge of the common clock, such that both streams are clocked on the rising edge of the common clock.

13. A system comprising:
an input to receive a first data stream having a first source clock and a second data stream having a second source clock, the first source clock and the second source clock having nominally, but not exactly, the same frequency;
a synchronization circuit to align the two data streams to a common clock, the common clock having nominally the same frequency as the first source clock or the second source clock, wherein the synchronization circuit determines a sign of a difference between frame rates of the first data stream and the second data stream, wherein each of the frame rates of the first stream and the second stream are determined based on the frequency of the common clock, and wherein the sign is used to determine an overflow condition or an underflow condition; and a digital video multiplexer to generate a multiplexed video signal of the two data streams, the multiplexed video signal clocked by the common clock and including the first data stream referenced to a rising edge of the common clock and the second data stream referenced to a falling edge of the common clock.

14. The system of claim 13, wherein the synchronization circuit comprises:
a first-in-first-out (FIFO) buffer to receive the first data stream clocked with the first source clock as an input, and to output the first data stream clocked with a second clock, wherein the second clock is the common clock.

15. The system of claim 14, wherein the common clock is the second source clock.

16. The system of claim 13, further comprising:
an underflow/overflow detector to detect the underflow or overflow condition in the FIFO buffer due to a frequency difference between the first source clock and the second source clock.

17. The system of claim 16, wherein the overflow/underflow detector drops a frame to correct for overflow.

18. The system of claim 16, wherein the overflow/underflow detector repeats a frame to correct for underflow.

19. A method comprising;
receiving a first data stream having a first source clock and a second data stream having a second source clock, the first source clock and the second source clock having nominally, but not exactly, the same frequency;
aligning the two data streams to a common clock by a synchronizing circuit, the common clock having the same frequency as the first source clock or the second source clock;
determining a sign of a difference between frame rates of the first data stream and the second data stream, wherein each of the frame rates of the first stream and the second stream are determined based on the frequency of the common clock, and wherein the sign is used to determine one of an underflow condition and an overflow condition; and
multiplexing the two data streams to generate a multiplexed video signal clocked by the common clock, the multiplexed video signal including the first data stream referenced to a rising edge of the common clock and the second data stream referenced to a falling edge of the common clock.

20. The method of claim 19, further comprising:
dropping a frame to correct for an overflow condition in the synchronizing circuit.

21. The method of claim 19, further comprising:
repeating a frame to correct for an underflow condition in the synchronizing circuit.

* * * * *